United States Patent
Yun et al.

(10) Patent No.: US 10,142,140 B2
(45) Date of Patent: Nov. 27, 2018

(54) APPARATUS FOR RECEIVING SIGNAL BASED ON FASTER-THAN-NYQUIST AND METHOD FOR USING THE SAME

(71) Applicant: ELECTRONICS AND TELECOMMUNICATIONS RESEARCH INSTITUTE, Daejeon (KR)

(72) Inventors: Joung-Il Yun, Daejeon (KR); Sang-Woon Kwak, Daejeon (KR); Myung-Sun Baek, Daejeon (KR); Hae-Chan Kwon, Daejeon (KR); Hyoung-Soo Lim, Daejeon (KR); Nam-Ho Hur, Sejong (KR); Nam-Shik Kim, Hwaseong (KR); Bi-Woong Chung, Yongin (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/421,295

(22) Filed: Jan. 31, 2017

(65) Prior Publication Data

US 2018/0034591 A1    Feb. 1, 2018

(30) Foreign Application Priority Data

Jul. 29, 2016    (KR) .................. 10-2016-0097106

(51) Int. Cl.
*H04L 1/00*    (2006.01)
*H04L 27/01*   (2006.01)
(Continued)

(52) U.S. Cl.
CPC ............ *H04L 27/01* (2013.01); *H04L 25/068* (2013.01); *H04B 1/71072* (2013.01);
(Continued)

(58) Field of Classification Search
CPC .. H04L 1/0071; H04L 27/01; H04L 25/03834; H04L 1/005; H04L 1/0054;
(Continued)

(56) References Cited

U.S. PATENT DOCUMENTS 8,514,966 B2    8/2013    Wajcer et al.
9,077,410 B2    7/2015    Song et al.
(Continued)

FOREIGN PATENT DOCUMENTS

KR    10-2015-0097048 A    8/2015

OTHER PUBLICATIONS

Baek et al. "An Efficient Turbo Equalization for Faster than Nyquist Signal", pp. 231-234, International Journal of Signal Processing Systems vol. 4, No. 3, Jun. 2016.*

(Continued)

*Primary Examiner* — Sophia Vlahos

(57) ABSTRACT

Disclosed herein are an apparatus and method for receiving a signal based on FTN. The apparatus for receiving a signal based on FTN includes an equalizer for creating a Log Likelihood Ratio (LLR) sequence by equalizing an FTN signal sequence sampled at an FTN signaling rate; a deinterleaver for deinterleaving the created LLR sequence; a decoder for decoding the LLR sequence by correcting errors in the deinterleaved LLR sequence; an interleaver for interleaving the decoded LLR sequence and providing the interleaved LLR sequence to the equalizer; and an FTN interference estimation unit for providing the FTN signal sequence, from which an FTN interference sequence is eliminated, to the equalizer, using the interleaved LLR sequence.

20 Claims, 10 Drawing Sheets

(51) Int. Cl.
*H04L 25/06* (2006.01)
*H04L 25/03* (2006.01)
*H04B 1/7107* (2011.01)

(52) U.S. Cl.
CPC ............ *H04L 1/005* (2013.01); *H04L 1/0054* (2013.01); *H04L 25/03006* (2013.01); *H04L 25/03834* (2013.01)

(58) Field of Classification Search
CPC ............ H04L 25/03006; H04L 25/068; H04B 1/71072
See application file for complete search history.

(56) References Cited

U.S. PATENT DOCUMENTS

| | | | | |
|---|---|---|---|---|
| 9,838,230 | B2* | 12/2017 | Gattami | H04L 25/497 |
| 2015/0010118 | A1* | 1/2015 | Beidas | H04L 25/03006 375/341 |
| 2015/0237407 | A1 | 8/2015 | Lee et al. | |
| 2015/0381392 | A1* | 12/2015 | Beidas | H04L 25/03286 375/308 |
| 2016/0218908 | A1 | 7/2016 | Baek et al. | |
| 2017/0078061 | A1* | 3/2017 | Sawahashi | H04L 5/0044 |

OTHER PUBLICATIONS

Anderson et al. "Turbo Equalization and an M-BCJR Algorithm for Strongly Narrowband Intersymbol Interference", pp. 262-266, ISITA2010, Taichung, Taiwan, Oct. 17-20, 2010.*

Maalouli et al., "Performance Analysis of a MMSE Turbo Equalizer with LDPC in a FTN Channel with Application to Digital Video Broadcast", pp. 1871-1875, Asilomar 2014.*

Prlja et al. "Receivers for Faster-than-Nyquist Signaling with and without Turbo Equalization", pp. 464-468, ISIT 2008, Toronto, Canada, Jul. 6-11, 2008.*

Sen et al. "A Low-Complexity Graph-Based LMMSE Receiver Designed for Colored Noise Induced by FTN-Signaling", pp. 642-647 IEEE 2014.*

* cited by examiner (b) τ = 0.9

APPARATUS FOR RECEIVING SIGNAL BASED ON FASTER-THAN-NYQUIST AND METHOD FOR USING THE SAME

CROSS REFERENCE TO RELATED APPLICATION

This application claims the benefit of Korean Patent Application No. 10-2016-0097106, filed Jul. 29, 2016, which is hereby incorporated by reference in its entirety into this application.

BACKGROUND OF THE INVENTION

1. Technical Field

The present invention relates generally to broadcasting and communications technology, and more particularly to technology for receiving signals based on Faster-Than-Nyquist (FTN).

2. Description of the Related Art

General communications systems use a Nyquist pulse-shaping method in order to transmit signals without interference between symbols. The Nyquist pulse-shaping method is a pulse-shaping method that is capable of achieving the maximum transmission rate in a given bandwidth without interference between symbols. However, in recent communication systems, requirements for higher spectral efficiency are increasing, but the Nyquist pulse-shaping method has a limitation as to transmission efficiency. Accordingly, as a method for improving this, the Faster-Than-Nyquist (FTN) method has been introduced.

In the FTN method, a pulse shape, given depending on frequency bandwidth, is kept, but the time interval between shaping of a pulse and shaping of the next pulse is decreased. That is, the gap between symbols is narrowed, whereby a signal, the pulses of which overlap each other, is transmitted. Accordingly, the FTN method necessarily causes Inter-Symbol Interference (ISI), but may have a higher signal transfer rate than the Nyquist pulse-shaping method for the same bandwidth.

As described above, the FTN method may improve transmission speed, but ISI, which is not caused in the Nyquist method, is included in a signal during the process of generating the signal and is transmitted when the signal is transmitted. Therefore, a receiver needs to eliminate ISI (hereinafter, referred to as "FTN interference") caused by FTN in order to reconstruct data without errors.

Because FTN interference is intentionally generated in the process of generating a signal to be transmitted, the pattern is accurately known, and thus FTN interference may be eliminated from the received signal. That is, a receiver generates a reference signal in which original data includes intentional interference caused by FTN, the received signal is compared with the reference signal, and thereby data from which the interference is eliminated is reconstructed. Also, if a pulse-shaping filter has a large enough number of taps to generate a bandlimited signal, FTN interference generated through such long filter taps causes interference between neighboring symbols in a wider range. Here, if a receiver cannot sufficiently eliminate the interference, it is difficult to improve reception performance, but if the range of the interference between neighboring symbols to be processed is wider, reception performance is improved, but complexity is increased.

Meanwhile, Korean Patent Application Publication No. 10-2015-0097048, titled "Signal-receiving apparatus based on Faster-Than-Nyquist and signal-decoding method thereof relates to an apparatus for receiving FTN-based signals and a method for decoding FTN-based signals. This patent discloses a signal-receiving apparatus based on FTN, which includes an equalizer for calculating, when a signal sampled with Faster-Than-Nyquist (FTN) is received on a communication channel, a posterior probability of information bits for the received signal through the BCJR algorithm and for calculating a Log Likelihood Ratio (LLR) using the calculated posterior probability; a deinterleaver for deinterleaving bit data output from the equalizer; a decoder for compensating for signal interference of the data bits deinterleaved by the deinterleaver using the LLR, thereby decoding the data; and an interleaver for interleaving the data output from the decoder and providing the interleaved data to the equalizer.

However, Korean Patent Application Publication No. 10-2015-0097048 does not mention a problem related to FTN interference occurring at a receiver of FTN-based signals.

SUMMARY OF THE INVENTION

An object of the present invention is to improve the equalization performance of an equalizer having relatively low complexity in a digital communication system using FTN.

Another object of the present invention is to accurately detect transmitted signals in an equalization process having relatively low complexity in a digital communication system using FTN.

A further object of the present invention is to effectively receive FTN signals by eliminating interference components that cannot be cancelled in an equalizer due to the complexity problem.

Yet another object of the present invention is to reduce the amount of resources for an interleaver when a signal receiver using a Bahl-Cocke-Jelinek-Raviv (BCJR) equalizer and a Low-Density Parity-Check (LDPC) decoder is implemented.

Still another object of the present invention is to improve the equalization performance of a BCJR equalizer by eliminating FTN interference components caused due to interference tap coefficients that are not incorporated in the BCJR equalizer, and to accurately receive FTN signals by improving the error-correction capability of an LDPC decoder.

In order to accomplish the above objects, an apparatus for receiving a signal based on Faster-Than-Nyquist (FTN) according to an embodiment of the present invention includes an equalizer for creating a Log Likelihood Ratio (LLR) sequence by equalizing an FTN signal sequence sampled at an FTN signaling rate; a deinterleaver for deinterleaving the created LLR sequence; a decoder for decoding the LLR sequence by correcting errors in the deinterleaved LLR sequence; an interleaver for interleaving the decoded LLR sequence and providing the interleaved LLR sequence to the equalizer; and an FTN interference estimation unit for providing the FTN signal sequence, from which an FTN interference sequence is eliminated, to the equalizer, using the interleaved LLR sequence.

Here, the FTN interference estimation unit may include a modulation unit for estimating a symbol sequence of the FTN signal sequence by modulating the interleaved LLR sequence; and an FTN interference filter for estimating the FTN interference sequence using the estimated symbol sequence, for eliminating the estimated FTN interference sequence from the FTN signal sequence, and for providing the equalizer with the FTN signal sequence from which the estimated FTN interference sequence is eliminated.

Here, the FTN interference filter may set FTN interference tap coefficients, which are incorporated in the equalizer in order to reconstruct symbols, to '0' in an FTN interference filter tap coefficient sequence of the FTN signal sequence, using the estimated symbol sequence.

Here, the FTN interference filter may estimate the FTN interference sequence by performing convolution of the estimated symbol sequence with the FTN interference filter tap coefficient sequence.

Here, the FTN interference filter may eliminate the estimated FTN interference sequence from the FTN signal sequence, thereby eliminating an FTN interference component, caused due to the FTN interference tap coefficients that are not incorporated in the equalizer, from the FTN signal sequence.

Here, the FTN interference filter may iterate a demodulation and decoding process until a result of subtracting the estimated symbol sequence from the symbol sequence of the FTN signal sequence satisfies a preset condition, thereby eliminating the FTN interference component, caused due to the FTN interference tap coefficients that are not incorporated in the equalizer, from the FTN signal sequence.

Here, the decoder may output the decoded LLR sequence as an information bit sequence when the result of eliminating the estimated FTN interference sequence from the FTN signal sequence satisfies a preset condition.

Here, the decoder may provide the decoded LLR sequence to the interleaver so as to iterate the demodulation and decoding process when the result of eliminating the estimated FTN interference sequence from the FTN signal sequence does not satisfy the preset condition.

Here, the equalizer may determine a range within which the FTN interference tap coefficients fall in consideration of a number of iterations of the demodulation and decoding process.

Here, when the equalizer is a BCJR equalizer for implementing a Bahl-Cocke-Jelinek-Raviv (BCJR) algorithm and when the decoder is an LDPC decoder for performing Low-Density Parity-Check (LDPC) decoding, the deinterleaver may deinterleave an extrinsic information sequence of the equalizer, acquired by eliminating an extrinsic information sequence of the decoder, calculated by the interleaver, from the LLR sequence created by the BCJR equalizer.

Here, when the equalizer is the BCJR equalizer and when the decoder is the LDPC decoder, the interleaver may provide the BCJR equalizer with the extrinsic information sequence of the decoder, acquired by eliminating the extrinsic information sequence of the equalizer from the interleaved LLR sequence.

Also, in order to accomplish the above objects, a method for receiving a signal based on Faster-Than-Nyquist (FTN), using an apparatus for receiving a signal based on FTN, according to an embodiment of the present invention, includes creating, by an equalizer, a Log Likelihood Ratio (LLR) sequence by equalizing an FTN signal sequence sampled at an FTN signaling rate; deinterleaving, by a deinterleaver, the created LLR sequence; decoding, by a decoder, the LLR sequence by correcting errors in the deinterleaved LLR sequence; interleaving, by an interleaver, the decoded LLR sequence; and providing, by an FTN interference estimation unit, the FTN signal sequence from which a part of an FTN interference sequence is eliminated to the equalizer, using the interleaved LLR sequence.

Here, providing the FTN signal sequence may include estimating a symbol sequence of the FTN signal sequence by modulating the interleaved LLR sequence; estimating the FTN interference sequence using the estimated symbol sequence; eliminating the estimated FTN interference sequence from the FTN signal sequence; and providing the equalizer with the FTN signal sequence from which the estimated FTN interference sequence is eliminated.

Here, estimating the FTN interference sequence may be configured to set FTN interference tap coefficients, which are incorporated in the equalizer in order to reconstruct symbols, to '0' in an FTN interference filter tap coefficient sequence of the FTN signal sequence, using the estimated symbol sequence.

Here, estimating the FTN interference sequence may be configured to estimate the FTN interference sequence by performing convolution of the estimated symbol sequence with the FTN interference filter tap coefficient sequence.

Here, eliminating the estimated FTN interference sequence may be configured to eliminate the estimated FTN interference sequence from the FTN signal sequence, whereby an FTN interference component, caused due to the FTN interference tap coefficients that are not incorporated in the equalizer, may be eliminated.

Here, eliminating the estimated FTN interference sequence may be configured to iterate a demodulation and decoding process until a result of subtracting the estimated symbol sequence from the symbol sequence of the FTN signal sequence satisfies a preset condition, whereby the FTN interference component that is not incorporated in the equalizer may be eliminated from the FTN signal sequence.

Here, decoding the LLR sequence may be configured to output the decoded LLR sequence as an information bit sequence when a result of eliminating the estimated FTN interference sequence from the FTN signal sequence satisfies a preset condition.

Here, decoding the LLR sequence may be configured to provide the decoded LLR sequence to the interleaver so as to iterate the demodulation and decoding process when the result of eliminating the estimated FTN interference sequence from the FTN signal sequence does not satisfy the preset condition.

Here, when the equalizer is a BCJR equalizer for implementing a Bahl-Cocke-Jelinek-Raviv (BCJR) algorithm and when the decoder is an LDPC decoder for performing Low-Density Parity-Check (LDPC) decoding, deinterleaving the created LLR sequence may be configured to deinterleave an extrinsic information sequence of the equalizer, acquired by eliminating an extrinsic information sequence of the decoder, calculated by the interleaver, from the LLR sequence created by the BCJR equalizer.

Here, when the equalizer is the BCJR equalizer and when the decoder is the LDPC decoder, interleaving the decoded LLR sequence may be configured to provide the BCJR equalizer with the extrinsic information sequence of the decoder, acquired by eliminating the extrinsic information sequence of the equalizer from the interleaved LLR sequence.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
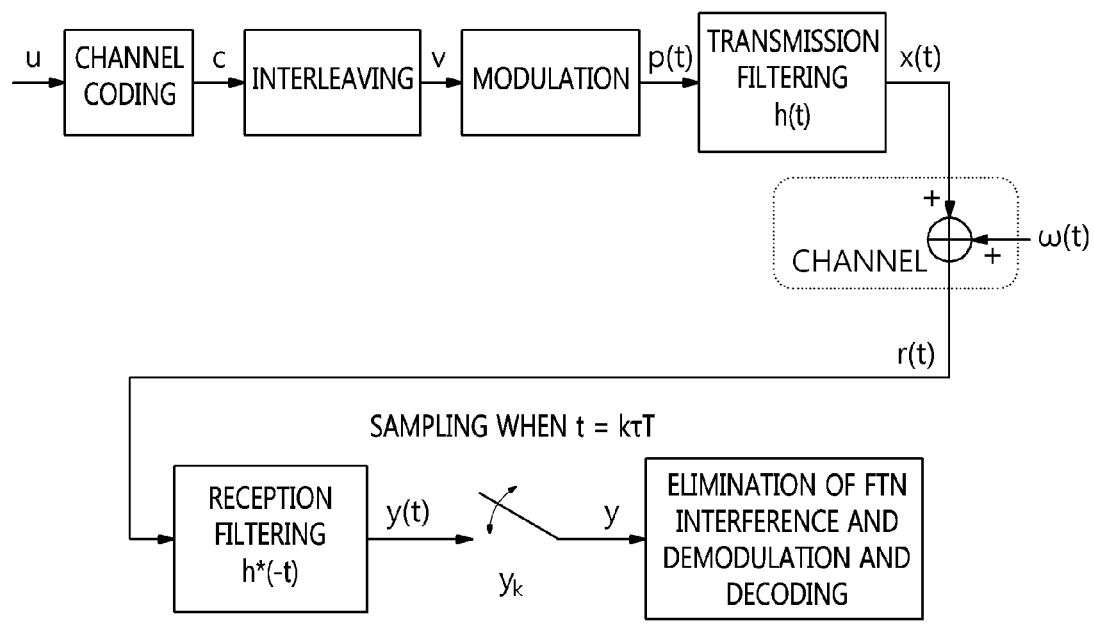
FIG. 1 is a view that shows an FTN-based signal reception model according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment according to the present invention will be described in detail with reference to the accompanying drawings.

FIG. 1 is a view that shows an FTN-based signal reception model according to an embodiment of the present invention.

Referring to FIG. 1, in the FTN-based signal reception model according to an embodiment of the present invention, $u=\{u_0, u_1, \ldots, u_{(K-1)}\}$, which is the information bit sequence to be transmitted and which has a length of K, is channel-coded with a coding rate R, whereby $c=\{c_0, c_1, \ldots, c_{(N-1)}\}$, which is a bit sequence having a length of N=K/R, may be acquired. The bit sequence c may be changed to $v=\{v_0, v_1, \ldots, v_{(N-1)}\}$ by changing the order in which the elements in c are arranged through an interleaving process. Then, the bit sequence v is mapped to $a=\{a_0, a_1, \ldots, a_{(L-1)}\}$, which is a symbol sequence having a length of L=N/m, through a modulation process (here, M-ary modulation may be used according to an embodiment of the present invention, thus $m=\log_2 M$ may be used), and a signal p(t), in which each symbol in the symbol sequence is output every τT seconds, may be represented as the following Equation (1):

$$p(t) = \sum_{l=0}^{L-1} a_l \delta(t - l\tau T) \quad (1)$$

where $a_l$ denotes the l-th symbol in the symbol sequence a, and δ(t) denotes the Dirac delta function.

Also, T is a symbol period when a transmission filter for limiting the band of p(t) satisfies the Nyquist criterion, and τ denotes an FTN factor. Here, the FTN factor τ in the range of 0<τ≤1 may be used, and the transmission speed may increase in proportion to 1/τ. Particularly, when τ=1, the transmission period may satisfy the Nyquist rate.

The modulated signal p(t) may pass through a transmission filter having an impulse response h(t) and may then be transmitted, and the transmitted signal x(t) may be represented as the following Equation (2):

$$x(t) = p(t) * h(t) = \sum_{l=0}^{L-1} a_l h(t - l\tau T) \quad (2)$$

Here, the transmission filter h(t) uses a Root Raised Cosine (RRC) filter. Also, according to an embodiment of the present invention, an * operator may be a convolution operator.

When the signal x(t) is transmitted through an Additive White Gaussian Noise (AWGN) channel, the received signal r(t) may pass through a filter matched with the transmitted signal in a filtering process at a receiver and be output as y(t), as shown in the following Equation (3):

$$y(t) = [x(t) + \omega(t)] * h^*(-t) = \quad (3)$$
$$x(t) * h^*(-t) + \tilde{\omega}(t) = \sum_{l=0}^{L-1} a_l g(t - l\tau T) + \tilde{\omega}(t)$$

Here, because g(t) corresponds to $h(t)*h^*(-t)$, and because h(t) is the impulse response of the RRC filter, g(t) may become the impulse response of a Raised Cosine (RC) filter. Also, ω(t) may correspond to the Additive White Gaussian Noise, and $\tilde{\omega}(t)$, which is a noise signal filtered by a reception filter, may have a colored noise feature in the case of FTN.

When a signal y(kτT), acquired by synchronizing with a symbol position and sampling y(t) with the τT period, is defined as $y_k$, $y_k$ may be represented as the following Equation (4):

$$y_k = \sum_{l=0}^{L-1} a_l g((k-l)\tau T) + \tilde{\omega}(k\tau T) = \sum_{l=0}^{L-1} a_l g_{k-l} + \tilde{\omega}_k \quad (4)$$

where $a_k$ is a symbol that is desired to be received, and $\tilde{\omega}_k$ may be the noise included in the sampled signal $y_k$ at t=kτT.

Also, g(kτT) is defined as $g_k$, and is called an FTN interference tap coefficient according to an embodiment of the present invention. When Equation (4) is rearranged from the view of reception of the symbol $a_k$, it may be defined as the following Equation (5):

$$y_k = a_k g_0 + z_k + \tilde{\omega}_k \text{ where } z_k = \sum_{l \neq k} a_l g_{k-l}, 0 \leq l \leq L-1 \quad (5)$$

In the above equation, $z_k$ is the FTN interference included in the signal $y_k$ sampled at t=kτT, and $z_k$ may cause an error when receiving the symbol $a_k$. That is, when τ=1, $g_k$ is a value for sampling g(t) with a Nyquist transmission period T, and because all the FTN interference tap coefficients, exclusive of $g_0$ (1 when g(t) is an RC filter), are 0, there is no FTN interference $z_k$.

However, when $0<\tau<1$, because most of the FTN interference filter tap coefficients $g_k$ have values other than 0, the FTN interference $z_k$ is added to the signal $y_k$, thus causing reception error.

Therefore, when a signal based on FTN is received, it is necessary to eliminate such an FTN interference component, whereby the transmitted symbols may be correctly detected.

Figure 2A:
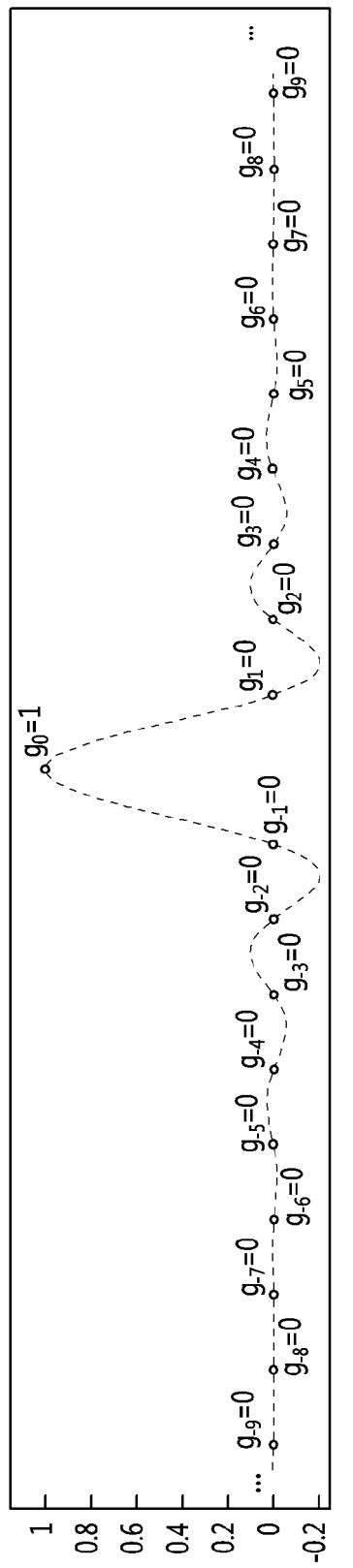
FIGS. 2A to 2C are graphs that show FTN interference filter tap coefficients depending on an FTN factor τ according to an embodiment of the present invention.
Figure 2B:
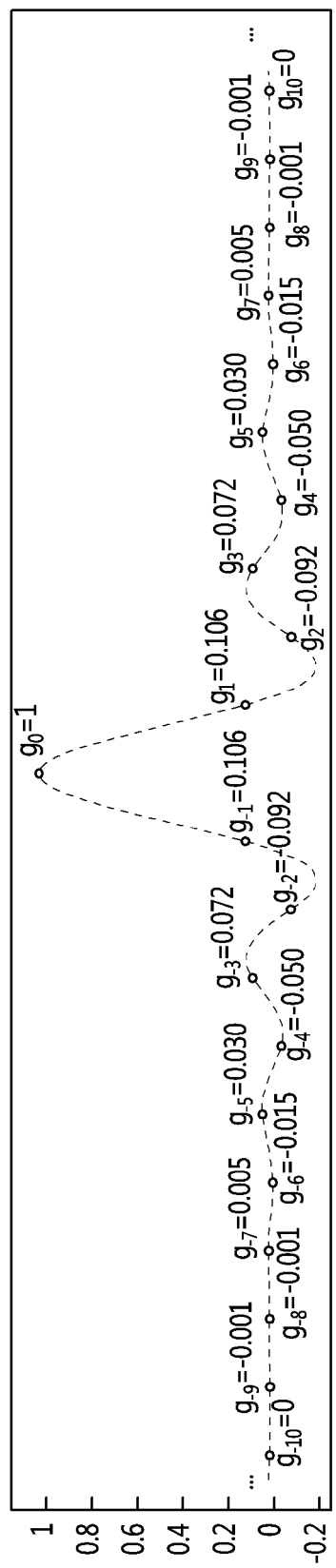
Figure 2C:
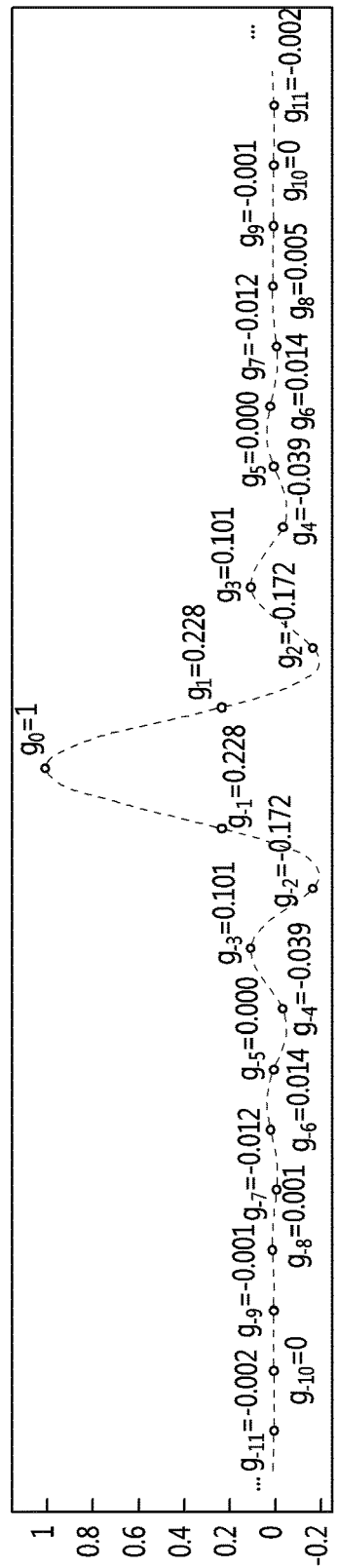

FIGS. 2A to 2C are graphs that show FTN interference filter tap coefficients based on an FTN factor $\tau$ according to an embodiment of the present invention.

FIG. 2A shows the FTN interference filter tap coefficients $g_k$ when $\tau=1$. It is confirmed that all FTN interference filter tap coefficients are 0, exclusive of the case in which $g_k$ is $g_0$.

FIG. 2B shows the FTN interference filter tap coefficients $g_k$ when $\tau=0.9$. It is confirmed that FTN interference filter tap coefficients have a value other than 0 in the range from $g_{-g}$ to $g_g$, and this may cause a reception error.

FIG. 2C shows the FTN interference filter tap coefficients $g_k$ when $\tau=0.8$. It shows that the value of $g_k$ is greatly increased compared to the case in FIG. 2B, and thus it is confirmed that the incidence of reception error is increased as $\tau$ is closer to 0.

Figure 3:
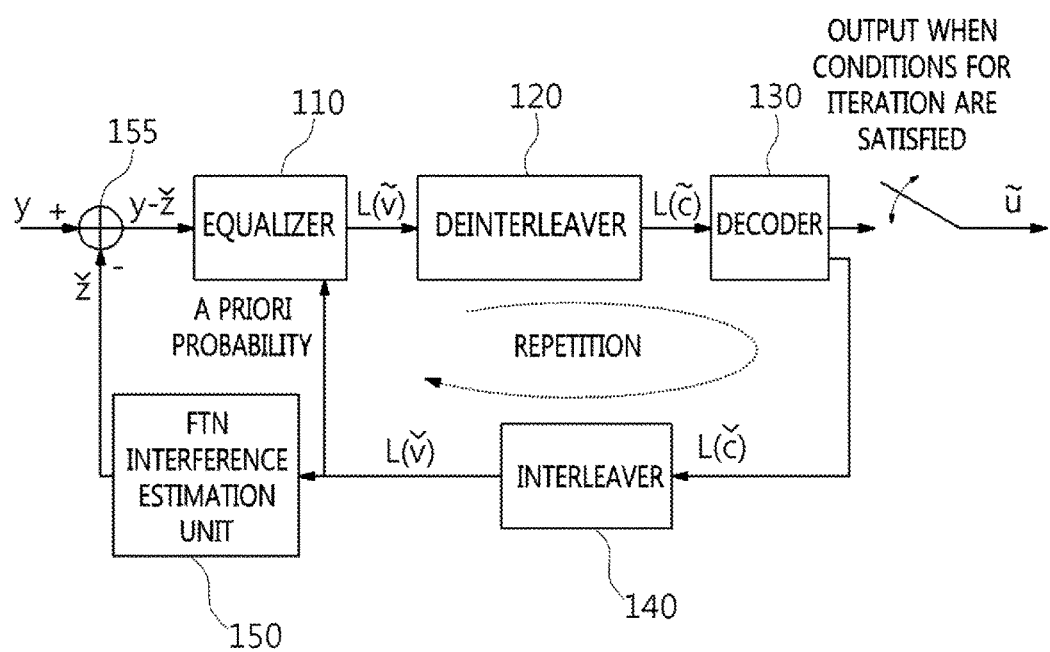
FIG. 3 is a block diagram of an apparatus for receiving an FTN-based signal according to an embodiment of the present invention.
Figure 4:
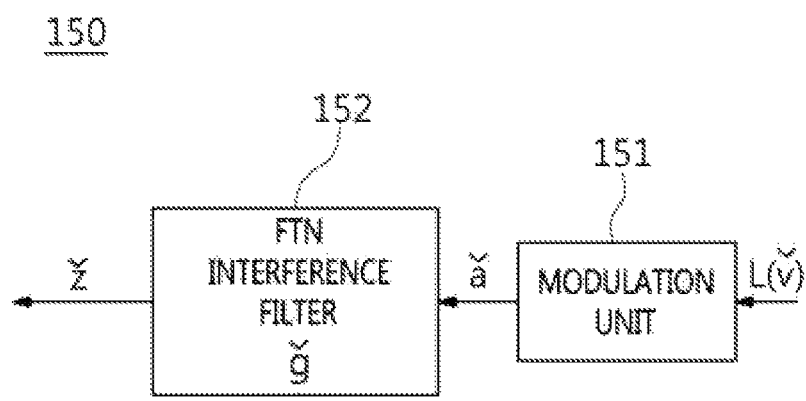
FIG. 4 is a block diagram that specifically shows an example of the FTN interference estimation unit illustrated in FIG. 3.

FIG. 3 is a block diagram that shows an apparatus for receiving a signal based on FTN according to an embodiment of the present invention. FIG. 4 is a block diagram that specifically shows an example of the FTN interference estimation unit illustrated in FIG. 3.

Referring to FIG. 3, an apparatus for receiving a signal based on FTN according to an embodiment of the present invention includes an equalizer 110, a deinterleaver 120, a decoder 130, an interleaver 140, and an FTN interference estimation unit 150.

The equalizer 110 may reconstruct distorted symbols by equalizing an FTN signal sequence y, which is sampled at the Faster-Than-Nyquist (FTN) signaling rate by being output from a reception filter, using a given FTN interference pattern, and may create $L(\tilde{v})$, which is a Log Likelihood Ratio (LLR) sequence of soft information about the received bits, by demodulating the reconstructed symbols.

Here, $L(\tilde{v})$ may be the LLR sequence of the received bits corresponding to v, which is the bit sequence output from the interleaving process illustrated in FIG. 1.

The deinterleaver 120 performs a deinterleaving process for restoring the order in which the elements of the LLR sequence $L(\tilde{v})$, created by the equalizer 110, are arranged, through the reverse process of interleaving at the transmitter, and may thereby output the deinterleaved LLR sequence $L(\tilde{c})$.

The decoder 130 may output a decoded LLR sequence $L(\check{c})$ by correcting errors in the deinterleaved LLR sequence $L(\tilde{c})$ through a channel decoding process.

The interleaver 140 performs an interleaving process on the decoded LLR sequence $L(\check{c})$ in the same order as the interleaving process at the transmitter, and may thereby output an interleaved LLR sequence $L(\check{v})$.

For iterative demodulation and decoding, the equalizer 110 applies the LLR sequence $L(\check{v})$ interleaved with a priori probability in the equalization and demodulation process, whereby more accurate soft information may be acquired. The decoder 130 may acquire more accurate probability information about the received bits by repeatedly performing the demodulation and decoding process, and may output an information bit sequence $\check{c}$, the error of which is corrected as much as possible, when a preset condition related to iteration is satisfied.

However, in the process of reconstructing symbols distorted as a result of the FTN interference, there is a problem in which a sufficient number of FTN interference filter tap coefficients is not incorporated due to the complexity of the equalization process. For example, when the equalizer 110 reconstructs $a_k$ from $y_k$ by incorporating only some FTN interference filter tap coefficients, $\{g_{-J}, \ldots, 0, \ldots, g_J\}$, noise and the FTN interference components caused by the tap coefficients $\{\ldots, g_{-(J+2)}, g_{-(J+1)}, g_{J+1}, g_{J+2}, \ldots\}$, which have not been incorporated in the equalizer 110, are not eliminated. Accordingly, the correct information bit sequence may not be received even if the signal is repeatedly equalized, demodulated and decoded. This may be arranged by changing the above Equation (5) to the following Equation (6):

$$y_k = a_k g_0 + \underbrace{\sum_{l \neq k, k-J \leq l \leq k+J} a_l g_{k-l}}_{\text{interference incorporated in equalization}} + \underbrace{\sum_{l<k-J, l>k+J} a_l g_{k-l}}_{\text{interference not incorporated in equalization}} + \tilde{\omega}_k \quad (6)$$

In order to solve the above problem, the FTN interference estimation unit 150 may provide the equalizer 110 with an FTN signal sequence from which the FTN interference sequence is eliminated using the interleaved LLR sequence $L(\check{v})$.

Referring to FIG. 4, the FTN interference estimation unit 150 may include a modulation unit 151 and an FTN interference filter 152.

The modulation unit 151 may estimate a symbol sequence ă by modulating the interleaved LLR sequence $L(\check{v})$ in the same manner as the modulation process at the transmitter.

Here, the modulation unit 151 may use an M-ary modulation method, and may estimate the length of the symbol sequence using $m=\log_2 M$.

The FTN interference filter 152 calculates the FTN interference components caused due to the FTN interference filter tap coefficients that are not incorporated in the equalizer 110, and thereby acquires the estimated FTN interference sequence as the following Equation (7):

$$\tilde{z} = \check{a} * \check{g} \quad (7)$$

Here, ğ indicates that the tap coefficients incorporated in the equalizer 110 are set to '0', among the FTN interference filter tap coefficients. The FTN interference filter 152 may set the FTN interference tap coefficients, incorporated in the equalizer in order to reconstruct symbols, to '0' using the estimated symbol sequence ă.

Here, as shown in Equation (7), the FTN interference filter 152 may estimate the FTN interference sequence $\tilde{z}$ by performing convolution of the estimated symbol sequence ă with ğ, in which the FTN interference tap coefficients, incorporated in the equalizer in order to reconstruct symbols, are set to '0'.

When the equalizer 110 incorporates only the tap coefficients $\{g_{-J}, \ldots, 0, \ldots, g_J\}$ for the reconstruction of symbols, $\check{g}_k$, which is the k-th FTN interference filter tap coefficient of ğ, may be represented as the following Equation (8):

$$\check{g}_k = \begin{cases} 0 & -J \leq k \leq J \\ g_k & \text{others} \end{cases} \quad (8)$$

Also, the FTN interference filter 152 eliminates the estimated FTN interference sequence ž from the received FTN signal sequence y, thereby creating an FTN signal sequence from which the estimated FTN interference sequence ž is eliminated, that is, y−ž, using the summing node 155. Also, the FTN interference filter 152 using the summing node 155 may provide y−ž to the equalizer 110.

Here, the equation for the k-th element of the FTN signal sequence from which the estimated interference sequence is eliminated may be represented as the following Equation (9):

$$y_k - \breve{z}_k = \underbrace{\sum_{k-J \leq l \leq k+J} a_k g_{k-l}}_{<1>} + \underbrace{\sum_{l<k-J, l>k+J} (a_l - \breve{a}_l) g_{k-l}}_{<2>} + \tilde{\omega}_k \quad (9)$$

The expression <1> in Equation (9) is a part that may be reconstructed using the FTN interference tap coefficients incorporated in the equalizer 110, and the expression <2> is a part in which the FTN interference component caused by the FTN interference tap coefficients that are not incorporated in the equalizer 110 is eliminated using the estimated symbol sequence. The expression <2> may approach 0 as $a_l$ becomes equal to $\breve{a}_l$. Here, $\breve{a}_l$ is an estimated symbol, modulated by the modulation unit 151, and if the result of channel decoding is accurate, $\breve{a}_l$ becomes equal to $a_l$. Accordingly, when the result of channel decoding becomes accurate through the iterative demodulation and decoding process, the expression <2> may converge on 0.

In other words, through the process of eliminating the estimated FTN interference sequence ž, acquired through FTN interference estimation in the iterative demodulation and decoding structure, from the FTN signal sequence y sampled at the FTN signaling rate, the FTN interference estimation unit 150 may eliminate interference that cannot be incorporated in the equalizer 110 due to a complexity problem.

Here, the equalizer 110 may use a variable interference tap, which changes J, which is used to determine the range of the FTN interference tap coefficients incorporated in the equalizer 110, depending on the number of iterations of demodulation and decoding.

That is, the equalizer 110 may eliminate the FTN interference components by incorporating the interference taps in a wide range for more accurate equalization even though the complexity of the equalizer is high in the early stage of the demodulation and decoding process.

Here, the equalizer 110 may more accurately estimate interference using the output of the decoder 130 through the iterative demodulation and decoding process.

Accordingly, the equalizer 110 may decrease the equalization complexity while acquiring sufficient equalization performance even if J, which is used to determine the range of the FTN interference tap coefficients incorporated therein, is decreased.

Here, the equalizer 110 may decrease J, which is used to determine the range of the FTN interference tap coefficients incorporated therein, until J becomes 0.

Further, when J is 0, the equalizer 110 may perform the same function as the M-ary demodulator.

That is, the equalizer 110 has equalization performance that improves with the iteration of the demodulation and decoding process, thereby effectively receiving the FTN interference signal.

Also, when the result of elimination of the estimated FTN interference sequence ž from the FTN signal sequence y satisfies a preset condition, the decoder 130 may output the decoded LLR sequence L(ĉ) as an information bit sequence û.

Here, when the result of elimination of the estimated FTN interference sequence ž from the FTN signal sequence y does not satisfy the preset condition, the decoder 130 may repeat the demodulation and decoding process by providing the decoded LLR sequence L(ĉ) to the interleaver 140.

Here, the demodulation and decoding process may be repeated until the difference between $a_l$ and $\breve{a}_l$ becomes 0 or until the difference becomes less than a preset value.

Figure 5:
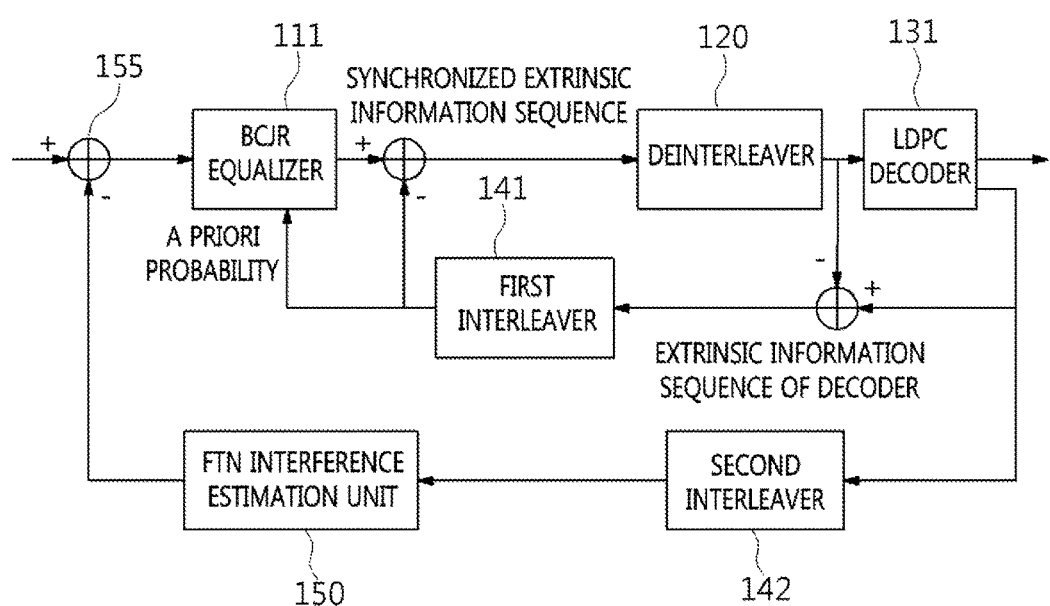
FIGS. 5 and 6 are block diagrams that show an FTN-based signal reception apparatus using a BCJR equalizer and an LDPC decoder according to an embodiment of the present invention.
Figure 6:
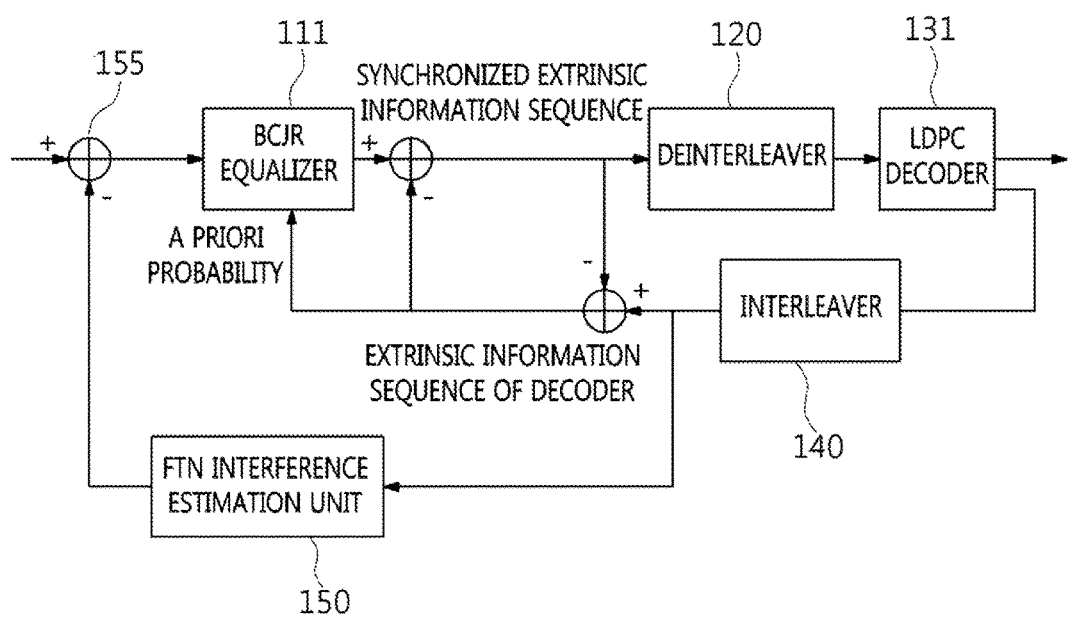

FIGS. 5 and 6 are block diagrams that show an FTN-based signal reception apparatus using a BCJR equalizer and an LDPC decoder according to an embodiment of the present invention.

Referring to FIG. 5, in an FTN-based signal reception apparatus using a BCJR equalizer and an LDPC decoder according to an embodiment of the present invention, the equalizer 110 of the FTN-based signal reception apparatus illustrated in FIG. 3 may correspond to the BCJR equalizer 111 for implementing the Bahl-Cocke-Jelinek-Raviv algorithm, and the decoder 130 may correspond to the LDPC decoder for performing Low-Density Parity-Check decoding.

Each of the BCJR equalizer 111 and the LDPC decoder 131 may use an extrinsic information sequence, acquired by subtracting an input LLR sequence from an output LLR sequence.

Here, the BCJR equalizer 111 and the LDPC decoder 131 may use the extrinsic information sequence for stable convergence of an LLR value depending on the iterative demodulation and decoding process.

The FTN interference estimation unit 150 is the same as the FTN interference estimation unit 150 illustrated in FIG. 3, and may use the FTN filter tap coefficients in Equation (8) in order to set the interference tap coefficients, incorporated in the BCJR equalizer 111 for the reconstruction of symbols, to '0'.

Also, the FTN interference estimation unit 150 may improve the equalization performance of the BCJR equalizer 111 by eliminating the FTN interference components, caused due to the FTN interference tap coefficients that are not incorporated in the BCJR equalizer 111, using the symbol sequence estimated through the iterative demodulation and decoding process, and may receive a more accurate FTN signal by improving the error correction performance of the LDPC decoder 131.

However, because the FTN-based signal reception apparatus using the BCJR equalizer 111 and the LDPC decoder 131 requires both a first interleaver 141 for providing an extrinsic information sequence of the decoder to the BCJR equalizer 111 and a second interleaver 142 for providing the LDPC-decoded LLR sequence to the FTN interference estimation unit 150, it is problematic in that the amount of resources for interleavers is increased when the apparatus is implemented in hardware.

Referring to FIG. 6, in order to solve the above problem, an FTN-based signal reception apparatus using the BCJR equalizer 111 and the LDPC decoder 131 in which the structure for calculating an extrinsic information sequence is changed is shown.

That is, the deinterleaver 120 may deinterleave an extrinsic information sequence of the equalizer, which is acquired by eliminating the extrinsic information sequence of the decoder, calculated by the interleaver, from the LLR sequence created by the BCJR equalizer 111.

Here, values stored after being calculated in the previous iteration are used as the extrinsic information sequence of the decoder, and the initial values in the extrinsic information sequence of the decoder may be set to '0'.

The interleaver 140 may provide the BCJR equalizer 111 with an extrinsic information sequence of the decoder, acquired by eliminating the extrinsic information sequence of the equalizer from the LLR sequence interleaved after being LDPC-decoded by the LDPC decoder 131.

Here, because the interleaver 140 may also provide the decoded LLR sequence, which is LDPC-decoded by the LDPC decoder 131, to the FTN interference estimation unit 150, only one interleaver 140 is used, thus reducing the amount of resources for the interleaver 140, compared to the FTN-based signal reception apparatus using the BCJR equalizer 111 and the LDPC decoder 131, illustrated in FIG. 5, when it is implemented in hardware.

Also, the extrinsic information sequence of the decoder may be calculated using the input and output of the LDPC decoder 131 at the current iteration. Here, the extrinsic information sequence of the decoder may be applied as a priori probability in the equalization process of the BCJR equalizer 111 at the next iteration.

Figure 7:
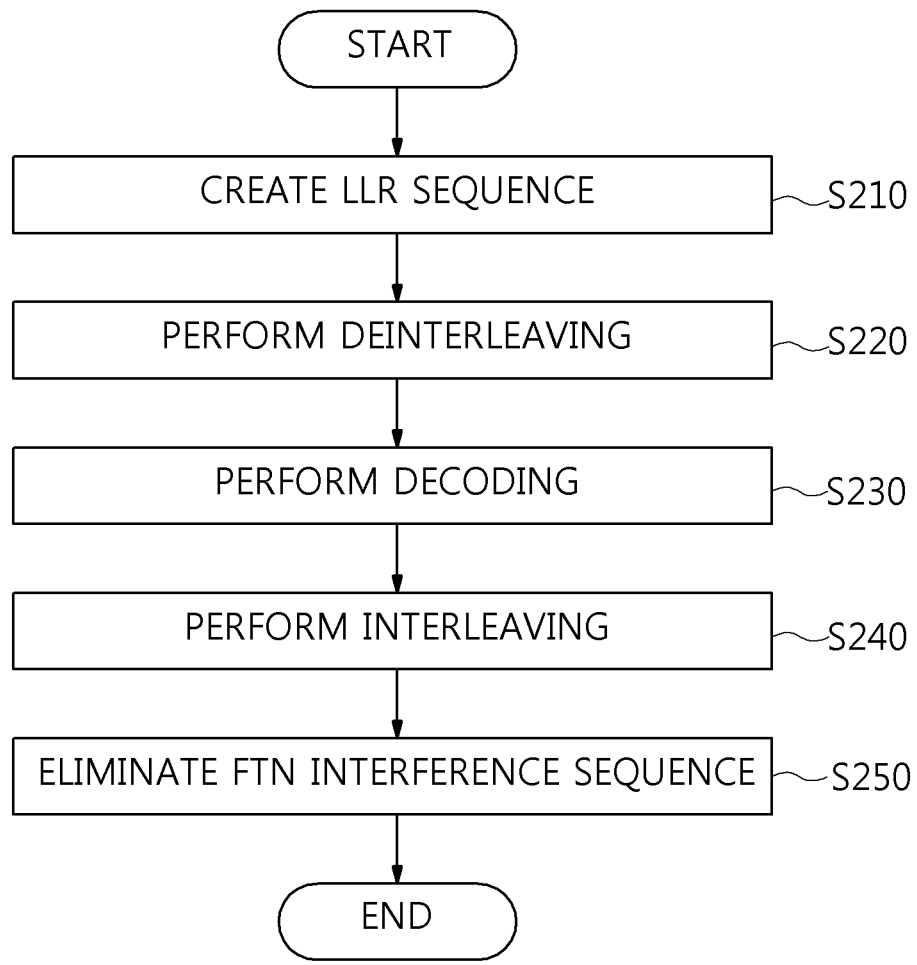
FIG. 7 is a flowchart that shows a method for receiving an FTN-based signal according to an embodiment of the present invention.
Figure 8:
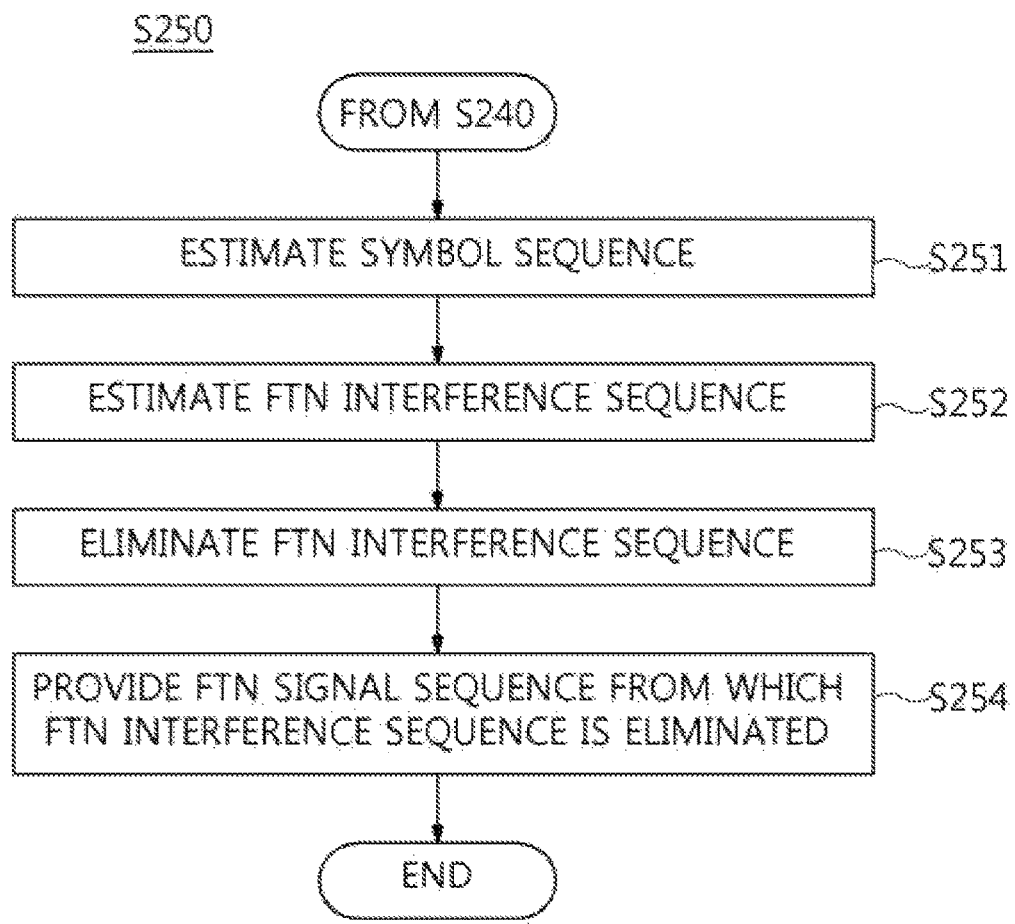
FIG. 8 is a flowchart that specifically shows an example of the step of eliminating an FTN interference sequence, illustrated in FIG. 7.

FIG. 7 is a flowchart that shows a method for receiving a signal based on FTN according to an embodiment of the present invention. FIG. 8 is a flowchart that specifically shows an example of the step of eliminating an FTN interference sequence, illustrated in FIG. 7.

Referring to FIG. 7, in the method for receiving a signal based on FTN according to an embodiment of the present invention, an LLR sequence may be created at step S210.

That is, at step S210, the equalizer 110 may reconstruct distorted symbols by equalizing an FTN signal sequence y, which is sampled at the Faster-Than-Nyquist (FTN) signaling rate by being output from a reception filter, using a given FTN interference pattern, and may create $L(\tilde{v})$, which is a Log Likelihood Ratio (LLR) sequence of soft information about the received bits, by demodulating the reconstructed symbols.

Here, $L(\tilde{v})$ be the LLR sequence of the received bits corresponding to v, which is the bit sequence output from the interleaving process illustrated in FIG. 1.

Also, at step S210, the equalizer 110 may use a variable interference tap, which changes J, which is used to determine the range of the FTN interference tap coefficients, depending on the number of iterations of a demodulation and decoding process.

Here, at step S210, the equalizer 110 may incorporate the interference tap in a wide range for more accurate equalization in the early stage of the demodulation and decoding process even if the complexity of the equalizer is high.

Here, the equalizer 110 may more accurately estimate interference using the output of the decoder 130 through the iterative demodulation and decoding process.

Accordingly, at step S210, the equalization complexity may be decreased while obtaining sufficient equalization performance even if J, which is used to determine the range of the FTN interference tap coefficients incorporated in the equalizer 110, is decreased.

Here, at step S210, J, which is used to determine the range of the FTN interference tap coefficients incorporated in the equalizer 110, may be decreased until it becomes 0.

Further, at step S210, when J is 0, the equalizer 110 may perform the same function as an M-ary demodulator.

That is, at step S210, the equalization performance of the equalizer 110 improves with the iteration of the demodulation and decoding process, and thus an FTN interference signal may be effectively received.

Also, at step S210, when the equalizer 110 implements the BCJR algorithm, the received FTN signal sequence is equalized through the BCJR algorithm, whereby the LLR sequence $L(\tilde{v})$ may be created.

Also, in the method for receiving a signal based on FTN according to an embodiment of the present invention, deinterleaving may be performed at step S220.

That is, at step S220, the deinterleaver 120 performs a deinterleaving process for restoring the order in which elements of the LLR sequence $L(\tilde{v})$, created by the equalizer 110, are arranged, through the reverse process of interleaving at the transmitter, and may thereby output the deinterleaved LLR sequence $L(\tilde{c})$.

Also, at step S220, when the equalizer 110 of the FTN-based signal reception apparatus illustrated in FIG. 3 is a BCJR equalizer 111 for implementing the BCJR algorithm and when the decoder 130 is an LDPC decoder for performing LDPC decoding, the deinterleaver 120 may deinterleave the extrinsic information sequence of the equalizer, acquired by eliminating the extrinsic information sequence of the decoder, calculated by the interleaver, from the LLR sequence created by the BCJR equalizer 111.

The extrinsic information sequence of the decoder may use values stored after being calculated in the previous iteration, and the initial values in the extrinsic information sequence of the decoder may be set to 0.

Also, in the method for receiving a signal based on FTN according to an embodiment of the present invention, decoding may be performed at step S230.

That is, at step S230, the decoder 130 may output a decoded LLR sequence $L(\tilde{c})$ by correcting errors in the deinterleaved LLR sequence $L(\tilde{c})$ through a channel decoding process.

Also, at step S230, when the decoder 130 is the LDPC decoder 131, the decoder may perform LDPC-decoding on the deinterleaved bit sequence acquired by deinterleaving the extrinsic information sequence of the equalizer, and may output the LLR sequence.

Also, in the method for receiving a signal based on FTN according to an embodiment of the present invention, interleaving may be performed at step S240.

That is, at step S240, the interleaver 140 performs an interleaving process on the decoded LLR sequence $L(\tilde{c})$ in the same order as the interleaving process at the transmitter, and may thereby output an interleaved LLR sequence $L(\tilde{v})$.

Also, at step S240, the interleaver 140 may provide the BCJR equalizer 111 with an extrinsic information sequence of the decoder, acquired by eliminating the extrinsic information sequence of the equalizer from the LLR sequence, interleaved after being LDPC-decoded by the LDPC decoder 131.

Here, at step S240, because the interleaver 140 may also provide the decoded LLR sequence, which is LDPC-decoded by the LDPC decoder 131, to the FTN interference estimation unit 150, only one interleaver 140 is used, thus reducing the amount of resources for the interleaver 140 compared to the FTN-based signal reception apparatus using the BCJR equalizer 111 and the LDPC decoder 131, illustrated in FIG. 5, when it is implemented in hardware.

Also, the extrinsic information sequence of the decoder may be calculated using the input and output of the LDPC decoder 131 at the current iteration. Here, the extrinsic information sequence of the decoder may be applied as a priori probability in the equalization process of the BCJR equalizer 111 at the next iteration.

Also, in the method for receiving a signal based on FTN according to an embodiment of the present invention, an FTN interference sequence may be eliminated at step S250.

Referring to FIG. 8, first, a symbol sequence may be estimated at step S251.

That is, at step S251, the modulation unit 151 of the FTN interference estimation unit 150 may estimate a symbol sequence ă by modulating the interleaved LLR sequence L(v̌) in the same manner as the modulation process at the transmitter.

Here, at step S251, the modulation unit 151 may use an M-ary modulation method, and may estimate the length of the symbol sequence using $m=\log_2 M$.

Also, the FTN interference sequence may be estimated at step S252.

That is, at step S252, the FTN interference filter 152 of the FTN interference estimation unit 150 calculates the FTN interference components caused due to the FTN interference filter tap coefficients that are not incorporated in the equalizer 110, and thereby acquires the estimated FTN interference sequence shown in Equation (7).

Here, at step S252, as shown in Equation (7), the FTN interference filter 152 may estimate the FTN interference sequence ž by performing convolution of the symbol sequence ă estimated by the modulation unit 151 with ğ, in which the FTN interference tap coefficients, incorporated in the equalizer in order to reconstruct symbols, are set to '0'.

Also, the FTN interference sequence may be eliminated at step S253.

That is, at step S253, the FTN interference filter 152 eliminates the estimated FTN interference sequence ž from the received FTN signal sequence y, thereby creating the FTN signal sequence from which the estimated FTN interference sequence ž is eliminated, that is, y−ž.

Here, the equation for the k-th element of the FTN signal sequence from which the estimated interference sequence is eliminated may be represented as Equation (9).

The expression <1> in Equation (9) is a part that may be reconstructed using the FTN interference tap coefficients incorporated in the equalizer 110, and the expression <2> is a part in which the FTN interference component caused due to the FTN interference tap coefficients that are not incorporated in the equalizer 110 is eliminated using the estimated symbol sequence. The expression <2> may approach 0 $a_l$ becomes equal to $ă_l$. Here, $ă_l$ is an estimated symbol, modulated by the modulation unit 151, and if the result of channel decoding is accurate, $ă_l$ becomes equal to $a_l$. Accordingly, when the result of channel decoding becomes accurate through the iterative demodulation and decoding process, the expression <2> may converge on 0.

In other words, at step S253, through the process of eliminating the estimated FTN interference sequence ž, acquired through FTN interference estimation in the iterative demodulation and decoding structure, from the FTN signal sequence y sampled at the FTN signaling rate, the FTN interference estimation unit 150 may eliminate the interference that cannot be incorporated in the equalizer 110 due to a complexity problem.

Also, an FTN signal sequence from which the FTN interference sequence is eliminated may be provided at step S254.

That is, at step S254, because the FTN interference filter 152 provides the equalizer 110 with the FTN signal sequence from which the FTN interference sequence is eliminated, the equalizer 110 may have equalization performance that improves with the iteration of the demodulation and decoding process, and may effectively receive the FTN interference signal.

Here, at step S254, when the result of elimination of the estimated FTN interference sequence ž from the FTN signal sequence y satisfies a preset condition, the decoder 130 may output the decoded LLR sequence L(č) as an information bit sequence ũ.

Here, at step S254, when the result of elimination of the estimated FTN interference sequence ž from the FTN signal sequence y does not satisfy the preset condition, the decoder 130 may repeat the demodulation and decoding process by providing the decoded LLR sequence L(č) to the interleaver 140.

Here, at step S254, the demodulation and decoding process may be repeated until the difference between $a_l$ and $ă_l$ becomes 0 or until the difference becomes less than a preset value.

The present invention may improve the equalization performance of an equalizer having relatively low complexity in a digital communication system using FTN.

Also, the present invention may accurately detect transmitted signals in an equalization process having relatively low complexity in a digital communication system using FTN.

Also, the present invention may effectively receive FTN signals by eliminating interference components that cannot be cancelled in an equalizer due to a complexity problem.

Also, the present invention may reduce the amount of resources for an interleaver when implementing a signal receiver using a Bahl-Cocke-Jelinek-Raviv (BCJR) equalizer and a Low-Density Parity-Check (LDPC) decoder.

Also, the present invention may improve the equalization performance of a BCJR equalizer by eliminating FTN interference components caused due to interference tap coefficients that are not incorporated in the BCJR equalizer, and may accurately receive FTN signals by improving the error-correction capability of an LDPC decoder.

As described above, the apparatus and method for receiving a signal based on FTN according to the present invention are not limitedly applied to the configurations and operations of the above-described embodiments, but all or some of the embodiments may be selectively combined and configured, so that the embodiments may be modified in various ways.

What is claimed is:

1. An apparatus for receiving a signal based on Faster-Than-Nyquist (FTN), comprising:
    an equalizer for creating a Log Likelihood Ratio (LLR) sequence by equalizing an FTN signal sequence sampled at an FTN signaling rate;
    a deinterleaver for deinterleaving the created LLR sequence;
    a decoder for decoding the LLR sequence by correcting errors in the deinterleaved LLR sequence;
    an interleaver for interleaving the decoded LLR sequence and providing the interleaved LLR sequence to the equalizer; and
    an FTN interference estimation unit for providing the FTN signal sequence, from which an FTN interference sequence is eliminated, to the equalizer, using the interleaved LLR sequence.

2. The apparatus of claim 1, wherein the FTN interference estimation unit comprises:
    a modulation unit for estimating a symbol sequence of the FTN signal sequence by modulating the interleaved LLR sequence; and an FTN interference filter for estimating the FTN interference sequence using the estimated symbol sequence, for eliminating the estimated FTN interference sequence from the FTN signal sequence, and for providing the equalizer with the FTN signal sequence from which the estimated FTN interference sequence is eliminated.

3. The apparatus of claim 2, wherein the FTN interference filter uses FTN interference tap coefficients, and wherein the FTN interference filter sets the FTN interference tap coefficients, which are incorporated in the equalizer in order to reconstruct symbols, to '0'.

4. The apparatus of claim 3, wherein the FTN interference filter estimates the FTN interference sequence by performing convolution of the estimated symbol sequence with the FTN interference tap coefficients.

5. The apparatus of claim 4, wherein the FTN interference filter eliminates the estimated FTN interference sequence from the FTN signal sequence, thereby eliminating an FTN interference component, due to the FTN interference tap coefficients that are not incorporated in the equalizer, from the FTN signal sequence.

6. The apparatus of claim 5, wherein the FTN interference filter iterates a demodulation and decoding process until a result of subtracting the estimated symbol sequence from the symbol sequence of the FTN signal sequence satisfies a preset condition, thereby eliminating the FTN interference component, due to the FTN interference tap coefficients that are not incorporated in the equalizer, from the FTN signal sequence.

7. The apparatus of claim 6, wherein the decoder is configured to:
output the decoded LLR sequence as an information bit sequence when the result of eliminating the estimated FTN interference sequence from the FTN signal sequence satisfies a preset condition, and
provide the decoded LLR sequence to the interleaver so as to iterate the demodulation and decoding process when the result of eliminating the estimated FTN interference sequence from the FTN signal sequence does not satisfy the preset condition.

8. The apparatus of claim 7, wherein the equalizer determines a range within which the FTN interference tap coefficients fall in consideration of a number of iterations of the demodulation and decoding process.

9. The apparatus of claim 8, wherein the equalizer is a BCJR equalizer for implementing a Bahl-Cocke-Jelinek-Raviv (BCJR) algorithm and wherein the decoder is an LDPC decoder for performing Low-Density Parity-Check (LDPC) decoding, the deinterleaver deinterleaves an extrinsic information sequence of the equalizer, acquired by eliminating an extrinsic information sequence of the decoder, calculated by the interleaver, from the LLR sequence created by the BCJR equalizer.

10. The apparatus of claim 9, wherein the equalizer is the BCJR equalizer and wherein the decoder is the LDPC decoder, the interleaver provides the BCJR equalizer with the extrinsic information sequence of the decoder, acquired by eliminating the extrinsic information sequence of the equalizer from the LLR sequence, which is interleaved after being LDPC-decoded by the LDPC decoder.

11. A method for receiving a signal based on Faster-Than-Nyquist (FTN), using an apparatus for receiving a signal based on FTN, comprising:
creating, by an equalizer, a Log Likelihood Ratio (LLR) sequence by equalizing an FTN signal sequence sampled at an FTN signaling rate;
deinterleaving, by a deinterleaver, the created LLR sequence;
decoding, by a decoder, the LLR sequence by correcting errors in the deinterleaved LLR sequence;
interleaving, by an interleaver, the decoded LLR sequence; and
providing, by an FTN interference estimation unit, the FTN signal sequence from which an FTN interference sequence is eliminated to the equalizer, using the interleaved LLR sequence,
wherein the FTN interference estimation units uses FTN interference tap coefficients to provide the FTN interference sequence, and the FTN interference tap coefficients corresponding to tap coefficients used by the equalizer to create the LLR sequence are set to '0'.

12. The method of claim 11, wherein providing the FTN signal sequence comprises:
estimating a symbol sequence of the FTN signal sequence by modulating the interleaved LLR sequence;
estimating the FTN interference sequence using the estimated symbol sequence;
eliminating the estimated FTN interference sequence from the FTN signal sequence; and
providing the equalizer with the FTN signal sequence from which the estimated FTN interference sequence is eliminated.

13. A method for receiving a signal based on Faster-Than-Nyquist (FTN), using an apparatus for receiving a signal based on FTN, the method comprising:
creating, by an equalizer, a Log Likelihood Ratio (LLR) sequence by equalizing an FTN signal sequence sampled at an FTN signaling rate;
deinterleaving, by a deinterleaver, the created LLR sequence;
decoding, by a decoder, the LLR sequence by correcting errors in the deinterleaved LLR sequence;
interleaving, by an interleaver, the decoded LLR sequence; and
providing, by an FTN interference estimation unit, the FTN signal sequence from which an FTN interference sequence is eliminated to the equalizer, using the interleaved LLR sequence,
wherein providing the FTN signal sequence comprises:
estimating a symbol sequence of the FTN signal sequence by modulating the interleaved LLR sequence;
estimating the FTN interference sequence using the estimated symbol sequence;
eliminating the estimated FTN interference sequence from the FTN signal sequence, and
providing the equalizer with the FTN signal sequence from which the estimated FTN interference sequence is eliminated, and
wherein estimating the FTN interference sequence comprises setting FTN interference tap coefficients used to estimate the FTN interference sequence, which are incorporated in the equalizer in order to reconstruct symbols, to '0'.

14. The method of claim 13, wherein estimating the FTN interference sequence comprises estimating the FTN interference sequence by performing convolution of the estimated symbol sequence with the FTN interference tap coefficients.

15. The method of claim 14, wherein eliminating the estimated FTN interference sequence comprises eliminating the estimated FTN interference sequence from the FTN signal sequence, whereby an FTN interference component, caused due to the FTN interference tap coefficients that are not incorporated in the equalizer, is eliminated.

16. The method of claim 15, wherein eliminating the estimated FTN interference sequence comprises iterating a demodulation and decoding process until a result of subtracting the estimated symbol sequence from the symbol sequence of the FTN signal sequence satisfies a preset condition, whereby the FTN interference component, caused due to the FTN interference tap coefficients that are not incorporated in the equalizer, is eliminated from the FTN signal sequence.

17. The method of claim 16, wherein decoding the LLR sequence comprises outputting the decoded LLR sequence as an information bit sequence when a result of eliminating the estimated FTN interference sequence from the FTN signal sequence satisfies a preset condition.

18. The method of claim 17, wherein decoding the LLR sequence comprises providing the decoded LLR sequence to the interleaver so as to iterate the demodulation and decoding process when the result of eliminating the estimated FTN interference sequence from the FTN signal sequence does not satisfy the preset condition.

19. The method of claim 18, wherein the equalizer is a BCJR equalizer for implementing a Bahl-Cocke-Jelinek-Raviv (BCJR) algorithm and wherein the decoder is an LDPC decoder for performing Low-Density Parity-Check (LDPC) decoding, deinterleaving the created LLR sequence comprises deinterleaving an extrinsic information sequence of the equalizer, acquired by eliminating an extrinsic information sequence of the decoder, calculated by the interleaver, from the LLR sequence created by the BCJR equalizer.

20. The method of claim 19, wherein the equalizer is the BCJR equalizer and wherein the decoder is the LDPC decoder, interleaving the decoded LLR sequence comprises providing the BCJR equalizer with the extrinsic information sequence of the decoder, acquired by eliminating the extrinsic information sequence of the equalizer from the interleaved LLR sequence.

\* \* \* \* \*